United States Patent [19]

Walter

[11] 4,365,188

[45] Dec. 21, 1982

[54] CIRCUIT ARRANGEMENT FOR MONITORING AND CONTROLLING CLOSING AND OPENING MOVEMENTS

[75] Inventor: Arthur Walter, Waldkirch, Fed. Rep. of Germany

[73] Assignee: Erwin Sick GmbH Optik-Elektronik, Waldkirch, Fed. Rep. of Germany

[21] Appl. No.: 177,772

[22] Filed: Aug. 13, 1980

[30] Foreign Application Priority Data

Aug. 24, 1979 [DE] Fed. Rep. of Germany ....... 2934401

[51] Int. Cl.[3] .......................... H02P 3/10; H02P 3/20

[52] U.S. Cl. ....................................... 318/282; 49/27; 200/61.43; 318/293; 318/468; 318/739

[58] Field of Search ..................... 200/61.43; 318/282, 318/289, 290, 551, 468, 756, 739, 488, 293; 49/27

[56] References Cited

U.S. PATENT DOCUMENTS

| | | | |
|---|---|---|---|
| 2,755,423 | 7/1956 | Hager | 318/468 |
| 2,843,694 | 7/1958 | Bertaux | 200/61.43 |
| 3,716,050 | 1/1973 | Richards | 200/61.43 |
| 3,813,590 | 5/1974 | Ellmore | 318/468 |
| 3,830,018 | 8/1974 | Arai et al. | 200/61.43 |
| 4,115,952 | 9/1978 | French | 200/61.43 |

*Primary Examiner*—David Smith, Jr.

[57] ABSTRACT

Closing and opening movements are effected by a reversible motor M. The motor M receives its power from a supply U via a feed circuit which includes switch contacts $r_1$, $r_2$ controlled by a relay R. The arrangement is such that a closing movement takes place when the relay is energized and an opening movement when the relay is deenergized. To select these two movements there is provided a selector switch S in the feed circuit which has two operative positions and an intermediate neutral position. The excitation winding of the relay R is included in a monitoring circuit in parallel with a strip-like safety switch SL. The strip-like safety switch SL is positioned in the path of the closing movement and has two strip-like contact bands 1, 2 which are pressed together if an object should become trapped in the path of the closing movement. If this occurs the excitation winding of the relay is short circuited and it automatically reverses the motor to convert the closing movement into an opening movement. A follower contact F is associated with the selector switch S and serves to short circuit the monitoring circuit during the opening movement so that it is only connected operatively in parallel with the feed circuit during the closing movement. The series arrangement of the contact strip 1, the excitation winding of the relay R and the contact strip 2 means that a breakage in either of the contact strips, i.e. a faulty safety sensor, will prevent potentially dangerous closing movements from taking place. A number of alternative embodiments are shown including variations using DC, single phase and three phase motors.

29 Claims, 10 Drawing Figures

CIRCUIT ARRANGEMENT FOR MONITORING AND CONTROLLING CLOSING AND OPENING MOVEMENTS

FIELD OF THE INVENTION

The invention relates to a circuit arrangement for monitoring and controlling closing and opening movements effected by a reversible motorized drive and has particular reference to an arrangement in which a closing movement can be reversed to an opening movement if a monitoring device detects an impediment to the closing movement.

BACKGROUND OF THE INVENTION

Many technological areas exist in which it is necessary to take precautions in connection with potentially dangerous closing movements in order to protect against persons and objects becoming trapped in the path of the closing movement. Examples of such applications include automatically closing doors, motorized vehicle windows and control guards for motorized presses.

For this purpose it is already known to use so-called safety strips which are in the fact elongate switch strips which can be inserted into the feed circuit for a drive used to bring about a closing movement and which are arranged to interrupt the feed circuit when a certain pressure is exerted thereon.

A disadvantage of the known arrangements of this kind is however that component failure or the break down of electrical conductors can occur which, despite the compression of the safety strip, allow the closing movement to continue so that the absolutely essential protection against entrapment is no longer reliably available.

The principal object underlying the present invention is to provide a circuit arrangement for monitoring and controlling closing and opening movements effected by a reversible drive which ensures that the potentially dangerous closing movement can be made safe by a self-monitoring system.

It is a particular object of the present invention to ensure, in apparatus of the above described kind, that a closing movement can only take place when the apparatus is operating faultlessly and when the safety sensor is not compressed. It is thus intended to provide an absolutely reliable protection against the possibility of an obstacle or a person becoming trapped in the path of the closing movement.

It is a yet further object of the present invention to provide a circuit arrangement of the above described kind which can be constructed witha minimum of technical complexity and expense.

BRIEF DESCRIPTION OF THE INVENTION

The above objects are satisfied, in accordance with the invention, by a circuit arrangement for monitoring and controlling closing and opening movements effected by a reversible motorized drive, the arrangement comprising a feed circuit for supplying power to said motorized drive, selector means for selecting an opening or closing movement, switch means in said feed circuit for changing the direction of said motorized drive with said switch means being controlled from said selector means via an energizing device and with said switch means being arranged to produce an opening movement when said energizing device is deenergized and a closing movement when said energizing device is energized, a monitoring circuit consisting of a parallel connection of said energizing device and a monitoring switch with said monitoring switch being arranged to detect the presence of an obstacle to said closing movement, and means for connecting said monitoring circuit operatively in parallel with said feed circuit only during said closing movement.

In an arrangement of the kind set out above the two possible directions of the reversible motorized drive, namely forward and reverse, which correspond respectively to the closing and opening movements, are selected in dependence on the state of energization of the energizing device which controls the switch means. It will be appreciated that the integration of the energizing device into a parallel circuit with a monitoring switch, i.e. a switch triggered by the presence of an obstacle to said closing movement, means that the monitoring switch is in a position to short circuit the energizing device. Thus, providing the deenergized state of the energizing device is associated with an opening movement, the monitoring switch is always able to reverse a potentially dangerous closing movement into an opening movement.

In a preferred practical embodiment the switch means comprises a relay switch and the energizing device is the excitation winding of the relay.

The above described arrangement is however also a fail safe arrangement which ensures, with very simple means, that potentially dangerous closing movements can also be prevented or reversed into an opening movement, when faults occur in the feed circuit or in the monitoring circuit.

It will be appreciated from a detailed consideration of the above described arrangement that faults such as breaks in the feed lines or the sticking of relay contacts will all result in the motorized drive either becoming inoperative or being reversed so that potentially dangerous closing movements cannot take place until the particular fault has been rectified.

The monitoring switch is preferably a strip-like safety sensor of flexible insulating material of the kind having two oppositely disposed spaced apart conductive contact strips, for example of thin spring steel, which become electrically interconnected when the safety sensor is compressed. With a safety sensor of this kind the feed to the energizing device, for example the excitation winding of a relay switch, is arranged to take place via these contact strips. The precise arrangement is preferably so contrived that current flows to the excitation winding via one of the contact strips, flows through the excitation winding and leaves the excitation winding via the other of the two contact strips. In this way the switch constituted by the safety sensor is connected in desired manner in parallel with the excitation winding however the series arrangement of the two contact strips and the excitation winding will mean that a breakage in one of the contact strips automatically prevents energization of the relay. Thus, as the deenergized state of the excitation winding corresponds to an opening movement, a fault in the safety sensor itself will also prevent a closing movement from being able to take place.

The monitoring circuit is electrically so dimensioned that the current in the monitoring circuit is always significantly smaller than the current in the feed circuit to the motorized drive. The monitoring circuit preferably includes at least one resistor whose resistance corresponds to that of the relay.

If, as envisaged by the invention, only relatively small currents flow in the monitoring circuit and this has the advantage that the safety sensor cannot be electrically damaged, irrespective of whether it is in the uncompressed or compressed condition. As a result no deterioration of the degree of reliability need occur even over long periods of time.

It will be appreciated that the monitoring circuit is only required to be connected operatively in parallel with the feed circuit during closing movements. It will however also be appreciated that the monitoring circuit cannot be allowed to remain operatively connected in parallel with the feed circuit during opening movements because otherwise the excitation winding of the relay switch would be maintained in the energized condition by the feed circuit. I.e., despite the selection of an opening movement at the selector switch, the excitation winding would be energized and would result in a closing movement.

For this reason the circuit is adapted to ensure that the monitoring circuit is connected operatively in parallel with the feed circuit only during closing movements.

One simple way of so adapting the circuit is to provide a device which operates to short circuit, during opening movements, the part of the monitoring circuit that contains the safety sensor and the relay.

In one variant of the invention this device consists of a follower contact of a selector switch which forms the aforementioned selector means. A selector switch of this kind incorporating a follower contact is a relatively simple construction and can be conveniently arranged to have a neutral position, a first position corresponding to the closing movement and also a second position corresponding to the opening movement. The follower contact is preferably arranged in a separate plane of the switch and is connected so that, in the switch position corresponding to the opening movement, it bridges the safety sensor and the relay.

A convenient practical circuit arrangement incorporating the above switch is shown in FIG. 1 of the accompanying drawings and will be later described in more detail.

It is admittedly possible in the absence of contact at the follower contact, or as a result of sticking of the motor reversing contacts, for a desired opening movement to be reversed to a closing movement. This possibility can however be accepted without danger because the opening movement in practice always takes place from the closed condition and it is not possible for a dangerous closing movement to be brought about from the already closed condition.

The decisive factor is however that a closing movement is only possible when several conditions are simultaneously satisfied namely: when the relay which is arranged in the monitoring circuit and which determines the direction of rotation of the motor engages, when the safety sensor is not compressed, when the monitoring circuit is operational, i.e. is not interrupted, and also when the device for short circuiting a part of the monitoring circuit is functioning correctly, i.e. in special cases that the follower contact does not stick.

It will now be appreciated that by the simplest of measures an extremely high degree of safety can be achieved.

When using a selector switch with a follower contact to effect short circuiting of the monitoring circuit during the opening movement it is possible, on selection of the opening movement, for the relay to be briefly energized prior to the establishment of contact at the follower contact. This brief energization of the relay can result in the motor producing an initial closing movement which may prove objectionable.

This possibility can be avoided by reversing the functions of the follower contact and one of the main contacts of the selector switch so that power is supplied to the reversible motorized drive via the follower contact and the monitoring circuit is short circuited via the main contact which always closes before the follower contact.

In an arrangement of this kind it is desirable to ensure that the current flow through the monitoring circuit is uni-directional. This can be achieved by inserting an appropriately poled diode into the monitoring circuit.

The diode provided in the monitoring circuit preferably simultaneously forms a component of a diode protection circuit for the relay. In this way it can be ensured that the voltage peaks which occur on dissipation of the energy stored in the excitation winding of the relay are rendered inert and damage to the contact strips of the safety sensor by arcing is precluded.

In an alternative embodiment of the invention an electronic blocking device, in particular a power diode, is used to separate the monitoring circuit from the motor feed circuit during opening movements.

The use of a power diode of this kind makes it possible to use a selector switch without a follower contact. In common with the earlier described embodiments the selector switch will have a neutral intermediate position and first and second make positions corresponding respectively to closing and opening movements. An arrangement of this kind is shown in FIG. 4 and will be later described in more detail. It suffices to say this stage that the power diode is inserted between the lines leading to the two contacts of the actuation switch.

In this embodiment the switch means for reversing the direction of said motorized drive conveniently consists of a relay switch having two ganged contacts with the fixed terminals of these contacts being connected to the terminals of the motorized drive and the change-over paths for the contacts lying in branch circuits parallel to the monitoring circuit.

An alternative embodiment using a power diode is also possible and will be later explained with reference to FIG. 5. It suffices to say at present that the power diode is arranged in a circuit branch parallel to the terminals of the motorized drive with the change-over path of the relay contact which connects the motor feed circuit with the monitoring circuit during opening movement lying in this circuit branch. This arrangement has the advantage that when the relay contacts stick in the position corresponding to closing movement and the selecting switch is moved to select opening movement, a pronounced short circuit occurs which leads to an interruption of the feed circuit via the fuse and thus signals the faulty condition of the relay.

It is also advantageous to provide an additional protective device which monitors the closing movement in the monitoring circuit. In this way the desired reliability can be improved.

The circuit arrangement of the invention is suitable for both DC and AC motors. When using an AC motor a capacitor motor is preferred because it is particularly easy to change the direction of rotation of this type of motor. If, in this instance, a DC relay is used to actuate the change-over contacts then a rectifier arrangement must naturally be inserted in front of this relay. If a charging capacitor is embodied in this rectifier arrangement then its value should be selected to be as small as possible in order to maintain the drop out delay, and thus the change-over time from the engaged condition, as small as possible.

If the circuit arrangement of the invention is used in connection with a three phase motor the monitoring circuit is preferably inserted between the null point and one phase of the three phase supply and the three phase motor is preferably actuated via a main relay which is arranged between null point and phase in a circuit parallel to the monitoring circuit.

BRIEF DESCRIPTION OF THE DRAWINGS

Embodiments of the invention will now be described by way of example only in more detail with reference to the accompanying drawings in which are shown.

Figure 1:
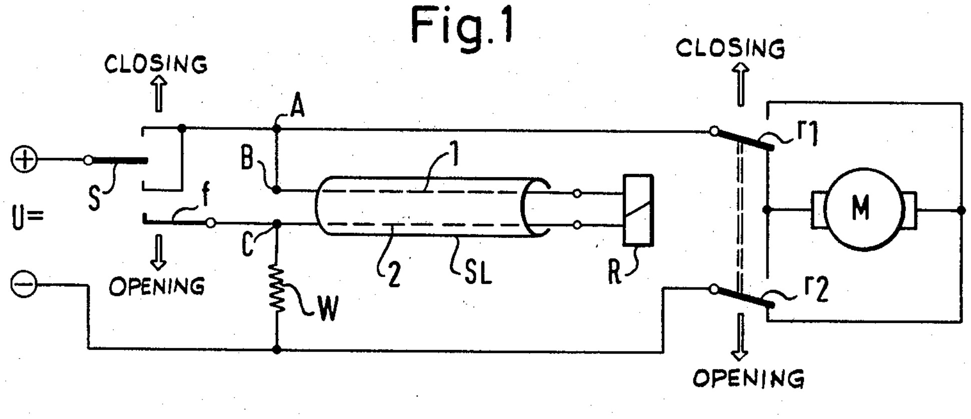
FIG. 1 a schematic circuit diagram of a first embodiment of a circuit arrangement in accordance with the present teaching, FIG. 2 a schematic cross-sectional view of a safety sensor as used in the circuit arrangement of FIG. 1, FIGS. 3 to 3*a* schematic circuit diagrams of further embodiments of a circuit arrangement in accordance with the present teaching, FIG. 4 a schematic circuit diagram of an alternative circuit arrangement in accordance with the present teaching, FIG. 5 a schematic circuit diagram of a modified embodiment of the circuit arrangement of FIG. 4, FIG. 6 a schematic circuit diagram of a circuit arrangement in accordance with the present teaching and which is suitable for use with an AC motor, FIG. 7 a circuit detail of an arrangement which is particularly suitable for use in the embodiment of FIG. 6 and FIGS. 8*a* to 8*b* schematic circuit diagrams of a circuit arrangement in accordance with the present teaching and suitable for use with a three phase drive.

Referring firstly to FIG. 1 there can be seen a circuit arrangement suitable for monitoring and controlling a reversible motorised drive M of the kind used to actuate motorised doors, windows and the like. Many such applications will be apparent to the person skilled in the art and do not presently need to be described in more detail. Suffice it to say that the reversible motorised drive will generally be used to move at least one part toward or away from a complementary surface thereby defining respective closing and opening movements.

In the present embodiment the reversible motorised drive M takes the form of a DC motor which is able to bring about closing and opening movement depending on its direction of rotation. The circuit arrangement is such that the direction of rotation of the motor can be changed at will. For this purpose the motor M is fed from a DC voltage source U via a selector switch S and relay contacts $r_1$,$r_2$. The relay contacts $r_1$, $r_2$ are ganged together and can be jointly changed over between two switch positions. The two switch positions correspond to different directions of rotation of the motor M. The relay contacts $r_1$, $r_2$ are controlled by the relay R the excitation winding of which is included in a monitoring circuit. The purpose of this monitoring circuit is to ensure that the motorised drive is interrupted or reversed if, during a closing movement, an object or part of a person should become trapped between the part being moved and the complementary surface. To detect an occurrence of this kind a safety sensor in strip-like form is arranged either on the edge of the movable part or along the complementary surface and is adapted to respond to contact pressure to close an electrical circuit. The safety sensor thus acts as a switch and can be referred to as a monitoring switch.

A typical safety sensor generally consists of two strips of metal which are normally spaced apart from one another but which are caused to contact one another if the safety sensor is subjected to externally applied pressure.

A monitoring circuit is accordingly provided in parallel with the above-mentioned motor feed circuit and consists of a first contact strip of a safety sensor, the excitation winding of the relay R, a second contact strip 2 of the safety sensor SL and a resistor W.

Figure 2:
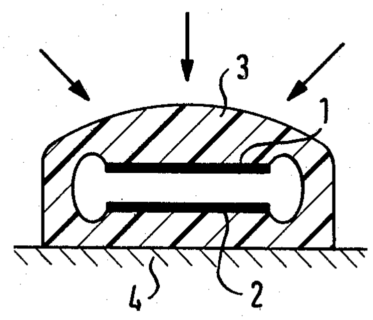

The safety strip illustrated in section in FIG. 2 consists of a relatively flexible insulating material, for example plastic, and is usefully of water tight construction. The two contact strips 1 and 2, which can for example consist of very thin spring steel, are arranged facing one another within a hollow cavity of the strip-like safety sensor in such a way that they only contact one another when pressure is exerted on the strip. The compressive force which is required to bring about contact between the two contact strips is preferably very small. The range of directions in which the applied pressure is able to produce contact between the two contact strips should however lie within as large an angular range as possible relative to the normal to the contact strips. The flexible body 3 of this safety sensor is, in practical use, attached to a fixed base 4 and is responsive to forces acting in the directions illustrated by the arrows.

The selector switch S provided to bring about actuation of the motor M has, as seen in FIG. 1 a follower contact f which is only operative when the switch S is moved to the "opening" position. In this case the follower contact f connects the positive pole of the voltage source U directly with the point C, i.e. with one terminal of the input resistor W which is the equivalent of a short circuit of the safety sensor SL and the relay R in the monitoring circuit.

As a result of this bridging of the safety sensor SL and the relay R these two components are now out of operation and the relay R can no longer engage. As a result a current flows from the positive terminal of the voltage source U via the contact $r_1$, the motor M and the contact $r_2$ back to the negative terminal of the voltage source. At the same time a current, the size of which is controlled by the resistor W, flows from the positive terminal of the voltage source U via the follower contact f, the point C and the resistor W back to the negative terminal.

Any faults which may occur such as lack of contact at the follower contact f or sticking of the contacts $r_1$, $r_2$ in the closing position are admittedly able to change the desired "opening" movement into the "closing" movment but this is not dangerous because the opening movement always takes place from the closed condition so that it is not possible for a dangerous closing movement to arise.

If the switch S is changed over to the "closing" position then the follower contact f remains inoperative and a current flows from the positive pole of the voltage source U via the contact strip 1 of the safety sensor SL, the excitation winding of the relay R, the contact strip 2 of the safety sensor SL and the resistor W back to the negative pole of the voltage source U. The relay R is energised by this flow current so that it engages and the contacts $r_1$, $r_2$ change over to the inverted position to that shown in FIG. 1. As a result a closing movement begins.

If the safety sensor SL is now compressed the relay R will at once be short circuited and drops out so that a direct reversal of the direction drive of the motor M occurs and converts the "closing" movement to an "opening" movement. A corresponding effect occurs if the monitoring circuit is interrupted in some other way or if the follower contact of the switch S is not functioning correctly i.e. when for example sticking of this follower contact occurs.

To summarize it can thus be said that a closing movement is only possible when the relay R engages, when the safety sensor SL is not compressed, when the monitoring circuit SL-R-W is in order and when the follower contact of the switch S does not stick.

An opening movement thus always arises, in addition to an intentional opening movement, if during a closing movement the safety sensor SL is compressed, if one of the feed lines to the components of the monitoring circuit is interrupted, if the relay R is defect and does not engage, if a short circuit occurs in the safety sensor SL, or in the feed line to the safety sensor SL, or if the follower contact f of the switch S brings about a short circuit.

Figure 3:
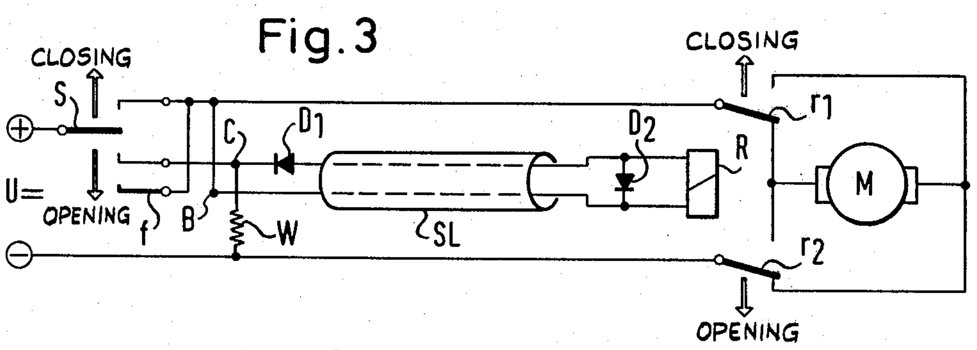

The modified embodiment of the circuit arrangement of FIG. 1 as shown in FIG. 3 offers the advantage that slow actuation of the switch S to the "opening" position does not result in engagement of the relay R and thus the motor M cannot run, even for short time, in the closing direction. This is achieved because a by-pass circuit over the resistor W is created via the main contact of the switch S which is the first to close on moving the switch to the "opening" position and because the motor feed circuit is closed via the follower contact f which subsequently becomes operative. A precondition for this manner of operation is that the initially formed by-pass circuit in which the resistor W lies is separated from the monitoring circuit via a blocking member which preferably consists of a diode $D_1$. The monitoring circuit is made uni-directional by the insertion of the diode $D_1$, i.e. current can only flow in one direction through the monitoring circuit and indeed when the monitoring circuit is operatively connected in parallel to the motor feed circuit during the closing movement in accordance with the basic principle underlying the present invention.

It is especially advantageous to use the diode $D_1$ at the same time as a component of a diode protection circuit for the relay R. This diode protection circuit accordingly consists, as seen in FIG. 3, of the diodes $D_1$ and $D_2$ with the diode $D_2$ being inserted between the connection terminals of the relay R.

The use of a diode protection circuit of this kind is above all advantageous because it prevents the voltage peaks, which can be very high and which occur on dissipation of the energy stored in the relay winding, from giving rise to arcing in the area of the safety sensor. Such arcing can of course burn points on the very thin and thus also very sensitive contact strips of the safety sensor SL and can thus severely deleteriously affect their operation over a period of time.

Figure 3A:
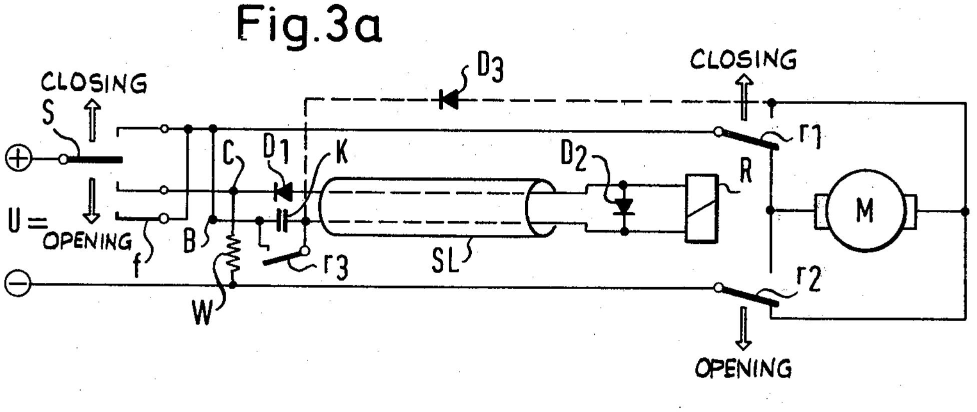

The variant shown in FIG. 3*a* differs from the circuit arrangement of FIG. 3 in that a capacitor K is inserted in the feed line to the safety sensor SL which comes from the closing contact of the actuation switch S. This capacitor K is associated with a bridging path in which is arranged a further contact $r_3$ which is also controlled by the relay R. In the passive condition, i.e. when the relay R is not energised, the bridging path is open. On energising the relay R the contact $r_3$ closes and results in the capacitor K being short circuited.

An alternative bridging path for the capacitor K is drawn in in broken lines. In this arrangement the relay contact $r_1$ which is arranged in the motor feed circuit and which serves to control the direction of rotation of the motor is also used to control the bridging path. A diode $D_3$ is inserted in the connecting line which is provided in this case between terminal of the contact $r_1$ which is operative during the closing movement and the terminal of the capacitor K adjacent the safety sensor. The polarity of this diode $D_3$ is so chosen that it is conductive when the selection switch S is set to the "closing" position, i.e. so that it allows a flow of current through the monitoring circuit.

The arrangement of a capacitor with controlled bridging circuit in the feed line to the safety sensor brings the advantage that the relay R can engage and the associated contacts can switch over during the transition into the closing movement brought about by the actuation switch S, however, that a transition into the "opening" movement takes place when the closing movement is stopped following compression of the safety sensor and dropping out of the relay R even if the pressure on the safety sensor is removed.

I.e. no renewed transition to the closing mode is possible on separation of the contact strips of the safety sensor although the actuating switch is still in the position "close".

Figure 4:
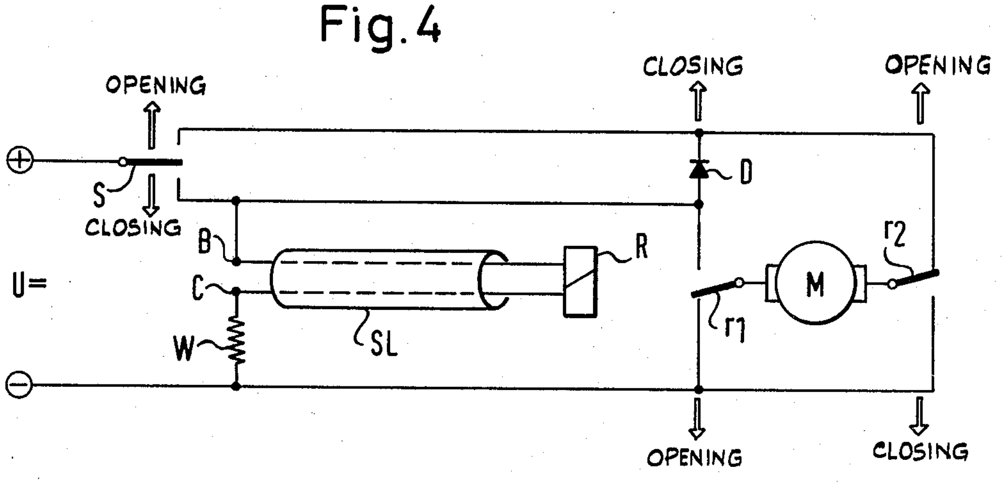

In the embodiment of a circuit arrangement in accordance with the invention as shown in FIG. 4 a simple change-over switch with a neutral central position is used in place of a change-over switch with a follower contact. An electronic blocking member is provided to separate the monitoring circuit from the motor feed circuit in the opening mode and preferably consists of a power diode D. The power diode D is inserted between the lines leading to the two contacts of the selector switch S and the two relay contacts $r_1$, $r_2$ with their fixed terminals arranged on the motor side are disposed with their change-over paths in branches lying parallel to the monitoring circuit. In this way it is ensured that the monitoring circuit is separated during the opening mode, in which the current flows from the positive terminal via the contact $r_2$, the motor M and the contact $r_1$ to the negative terminal, from this motor feed circuit and is thus inoperative. If the switch S is brought into the position "close" then the monitoring circuit is once again in parallel with the motor feed circuit so that it can completely fulfill its function.

Figure 5:
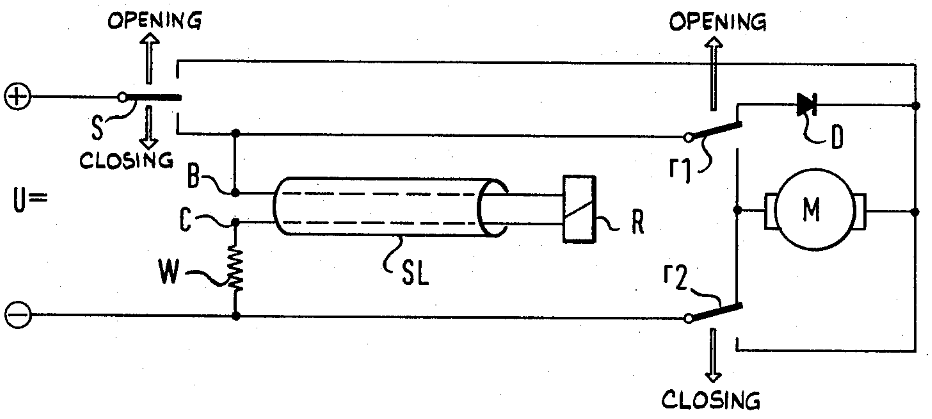

The variant of the circuit arrangement that is shown in FIG. 5 is distinguished from the embodiment of FIG. 4 in that the power diode D is arranged in a branch connected in parallel with the motor terminals and the circuitry of the contacts $r_1$, $r_2$ is so selected that the change-over path of the relay contact $r_1$ which connects the motor feed circuit in the opening mode with the monitoring circuit is disposed in the branch containing the power diode.

The advantage of this special circuit arrangement resides in the fact that, when the contacts $r_1$, $r_2$ remain stuck to the "closing" side and the actuation switch S is moved to "open" a pronounced short circuit occurs which signals an occurrence of faulty behaviour of the relay so that, as a result of the distruction of the associated fuse which is brought about by this short circuit, further actuation of the motor M is prevented and thus dangers occasioned by the faulty behaviour of the relay R can no longer arise.

Figure 6:
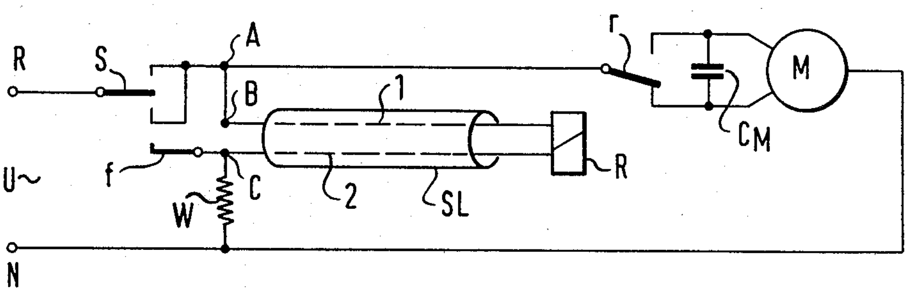

FIG. 6 shows an embodiment of a circuit arrangement used in conjunction with a motor M including an input capacitor $C_M$, which is suitable for single phase AC. The direction of rotation of a capacitor motor of this kind can be particularly simply reversed as only a single change-over contact r is necessary for this purpose. The contact r must be alternately connected to one of the two terminals of the capacitor $C_M$ connected in front of the motor. This contact r is once again controlled by the relay R which is arranged, in similar manner to that already explained, in the monitoring circuit.

Figure 7:
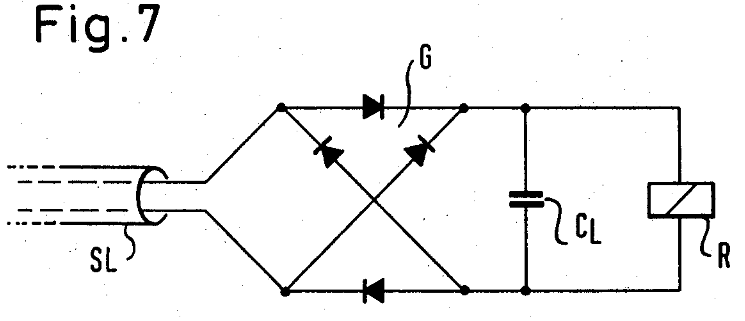

If a DC relay R is to be used to control a motor driven by AC, in place of an AC relay R, then a rectifier circuit G has to be placed in front of this relay as shown in FIG. 7.

If a charging capacitor $C_L$ is associated with this rectifier circuit G the value of this charging capacitor $C_L$ should be selected to be as small as possible in order to maintain the drop out delay and thus the switch over time from the engaged condition as small as possible.

Figure 8A:
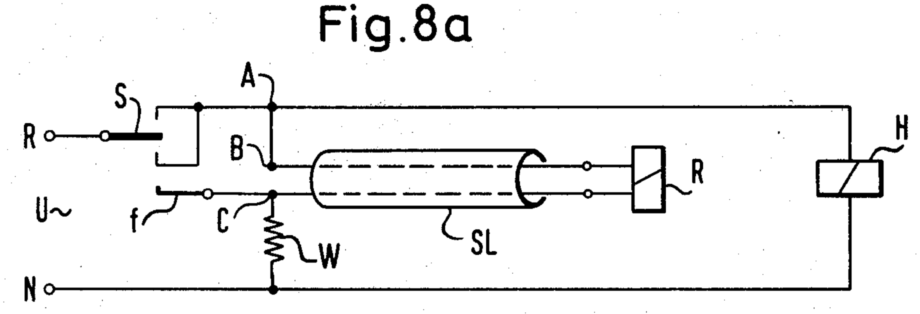
Figure 8B:
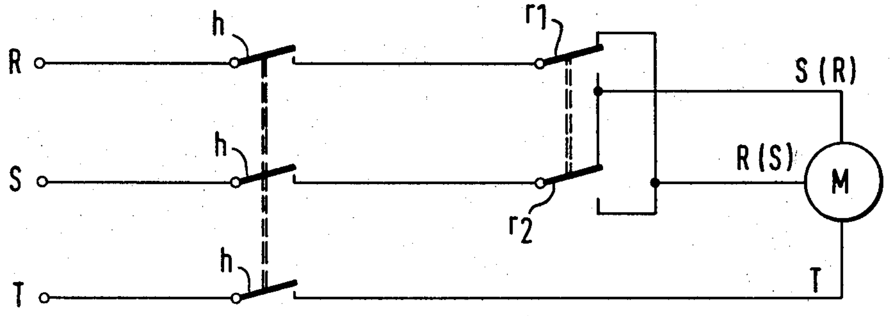

FIGS. 8*a* and 8*b* show the use of the circuit arrangement in accordance with the invention in conjunction with a three phase drive.

The phases RST of the three phase network from which the motor M is fed are shown in FIG. 8*b*.

The switching on of the motor M takes place via contacts h of a main relay H. Change-over contacts $r_1$ and $r_2$ of the relay R are arranged in the phases R and S and this enables the phases R and S to be interchanged and thus makes possible the reversal of the direction of rotation of the motor M.

As seen in FIG. 8*a* the main relay H which switches on the motor M is arranged in a circuit provided between the phase R and the null point N. The monitoring circuit provided in accordance with the invention and incorporating safety sensor SL, relay R and resistor W once again lies in parallel with this circuit. Similarly, in the same manner that has already been described a part of the monitoring circuit namely that part which incorporates the safety sensor and the relay, is bridgable by means of a follower contact f of the actuation switch S when the switch S is moved to the position "open". The function of this circuit arrangement corresponds to the manner of operation explained in connection with FIG. 1 and a corresponding high degree of reliability is also achieved.

If the three phase motor M cannot be directly switched over to the other direction of rotation because the current is too high additional time members can be used as known per se. It should also be mentioned that in the above specific description the particular end contacts which terminate the opening or closing movements on reaching the end position have not been mentioned because they are customary in the art, are familiar to the person skilled in the art and are without significance as far as comprehending the present invention is concerned.

It will also be appreciated by those skilled in the art that various modifications can be made to the above described arrangements without departing from the scope of the present teaching. In particular it will be understood that although all embodiments as described employ a motorised drive in which the direction of the motor is reversed, it would be equally possible to employ a motor with a constant direction of rotation and a clutch and gearing arrangement which allowed the drive from the motor to be reversed. The above described circuits could be used in much the same manner to adjust the clutch or gear box to reverse the drive from the motor.

Furthermore although a relay switch is the preferred device for reversing the drive of the motor, it will be appreciated that solid state or other switching means could also be used. In this event the energizing device can, for example, take the form of the base circuit of a transistor switch. The use of monitoring switches other than a pressure sensitive safety sensor can also be considered. The monitoring switch could for example take the form of a switch triggered by an acoustic or optical arrangement.

I claim:

1. A control circuit for a reversible motorized drive used to produce closing and opening movements said control circuit comprising a feed circuit; switch means for connecting said feed circuit to said reversible motorized drive and having first and second positions corresponding respectively to said closing movement and said opening movement; an energizing device for moving said switch means to said first position when energized and for moving said switch means to said second position when deenergized; selector switch means for selecting an opening or closing movement, said selector switch means being arranged to engergize said energizing device from said feed circuit when closing movement is selected and to isolate said energizing device from said feed circuit when an opening movement is selected; a monitoring switch having first and second terminals, said monitoring switch being arranged to close when the closing movement is obstructed but being otherwise open; wherein said energizing device is connected between said first and second terminals and is short circuited on closing of said monitoring switch, and wherein a series monitoring circuit comprising said first terminal, said energizing device and said second terminal is operatively connected in parallel with said feed circuit by said selector switch means only when a closing movement is selected.

2. A circuit in accordance with claim 1 and wherein said monitoring switch comprises a strip-like sensor.

3. A circuit in accordance with claim 2 and wherein said switch means comprises a relay switch and said energizing device comprises an excitation winding of said relay.

4. A circuit in accordance with claim 3 and wherein a resistor is connected in series with said series circuit to limit the current therethrough.

5. A circuit in accordance with claims 4 and wherein said strip-like sensor consists of flexible insulating material and has first and second oppositely disposed conductive contact strips which are contactable one with another on compression of the strip-like sensor and wherein said series monitoring circuit comprises said first contact strip, said first terminal, said first excitation winding, said second terminal and said second contact strip.

6. A circuit in accordance with claim 5 and wherein the resistance of said resistor corresponds to that of said relay.

7. A circuit in accordance with claim 4 and wherein said resistor is inserted between a feed line of said feed circuit and one of said first and second contact strips of said sensor.

8. A circuit in accordance with claim 5 and wherein a device is provided to short circuit at least a part of the monitoring circuit including said strip-like sensor and said excitation winding during said opening movement.

9. A circuit in accordance with claim 5 and wherein a device is provided in said monitoring circuit for blocking the monitoring circuit when said opening movement is selected.

10. A circuit in accordance with claim 9 and wherein said device is a diode.

11. A circuit in accordance with claim 10 and wherein said diode is simultaneously a component of a diode protection circuit for said relay.

12. A circuit in accordance with claim 8 and wherein said device consists of a follower contact of the selector switch means.

13. A circuit in accordance with claim 7 and wherein one terminal of said resistor in the monitoring circuit is connected to said relay and is connectable during opening movement across said feed circuit to form a by-pass circuit.

14. A circuit in accordance with claim 1 and wherein said switch means includes a follower contact, said follower contact being arranged to supply power to said feed circuit during opening movement only and wherein means is provided for forming a by-pass circuit via a main contact of said selector switch and a resistor connected between a feed line to said feed circuit and said monitoring circuit, with said selector switch being adapted so that said main contact becomes effective before said follower contact.

15. A circuit in accordance with claim 14 and wherein, during opening movement, the monitoring circuit is separated from said feed circuit by an electronic blocking member.

16. A circuit in accordance with claim 15 and wherein said electronic blocking member is a power diode.

17. A circuit in accordance with claim 16 and wherein said selector switch means is constructed as a change-over switch with a neutral intermediate position and first and second contacts respectively associated with said opening and closing movements, said power diode is connected between lines leading to the first and second contacts of the change-over switch and wherein said switch means is a relay switch having first and second movable contacts with their fixed terminals connected to said motorized drive and their change-over paths lying in circuit branches parallel to said monitoring circuit.

18. A circuit in accordance with claim 16 and wherein said selector switch means is constructed as a change-over switch having a neutral intermediate position and first and second contacts respectively associated with said opening and closing movements, said power diode being arranged in a branch circuit connected in parallel with terminals of the reversible motorized drive and wherein said switch means is a relay-switch-having a relay contact which connects the feed circuit with the monitoring circuit during said opening movement, with the change-over path of this relay contact being disposed in said branch circuit.

19. A circuit in accordance with claim 3 and wherein an additional protective device which oversees said closing movement is inserted in the monitoring circuit.

20. A circuit in accordance with claim 3 and wherein the reversible motorized drive which effects the opening and closing movements is a capacitor motor for single phase AC.

21. A circuit in accordance with claim 20 and wherein a rectifier arrangement is inserted in front of said relay.

22. A circuit in accordance with claim 3 and wherein said reversible motorized drive which effects the opening and closing movements comprises a three phase AC motor, said feed circuit comprises a three phase supply having a null point and three phases, and the monitoring circuit is inserted between the null point and one phase of the three phase supply.

23. A circuit in accordance with claim 22 and wherein the AC motor is connected via a main relay which is arranged between null point and phase in a circuit parallel to the monitoring circuit.

24. A circuit in accordance with claim 3 and wherein a capacitor which is bridgable during the closing movement by a contact of said relay is arranged in a feed line to the sensor.

25. A circuit in accordance with claim 24 and wherein said relay has first and second contacts controlling said feed circuit, one of these contacts being used as the bridging contact, and wherein a diode which conducts during closing movement is arranged in a connection line between a terminal of this contact which is energized during the closing movement and a terminal of the capacitor which is connected to the sensor.

26. A circuit in accordance with claim 1 and wherein said reversible motorized drive comprises a motor the direction of rotation of which is reversible.

27. A control circuit for a reversible motorized device used to produce closing and opening movements said control circuit comprising a feed circuit; relay switch means for connecting said feed circuit to said reversible motorized drive and having first and second positions corresponding respectively to said closing movement and said opening movement; said relay switch means having an excitation winding arranged to move it into said first position when energized and to move it into said second position when deenergized; selector switch means for selecting an opening or closing movement, said selector switch means being arranged to energize said excitation winding from said feed circuit when closing movement is selected and to isolate said excitation winding from said feed circuit when an opening movement is selected; and a strip-like safety sensor arranged in the path of said closing movement having first and second oppositely disposed conductive contact strips arranged to contact one another when the closing movement is obstructed but otherwise being space apart; wherein said excitation winding is connected between said first and second contact strips to form a series monitoring circuit in which current flow along said first contact strip, through said excitation winding, and along said second contact strip with said excitation winding being short circuited by contact of said contact strips; wherein said series monitoring circuit is operatively connected in parallel with said feed circuit by said selector switch means only when a closing movement is selected, and wherein means is provided for limiting the current through said contact strips when said excitation winding is short circuited.

28. A control circuit in accordance with claim 2, wherein said means comprises a resistor connected between one of said contact strips and said feed circuit.

29. A control circuit in accordance with claim 2, wherein said strip-like safety sensor has first and second oppositely disposed contact strips and wherein current flows during said closing movement in said series monitoring circuit through said first contact strip, via said first terminal to said energizing device and then via said second terminal through said second contact strip.

* * * * *